Jan. 13, 1925.  1,523,259
S. DE P. CURRY
PROTECTOR
Filed May 5, 1924
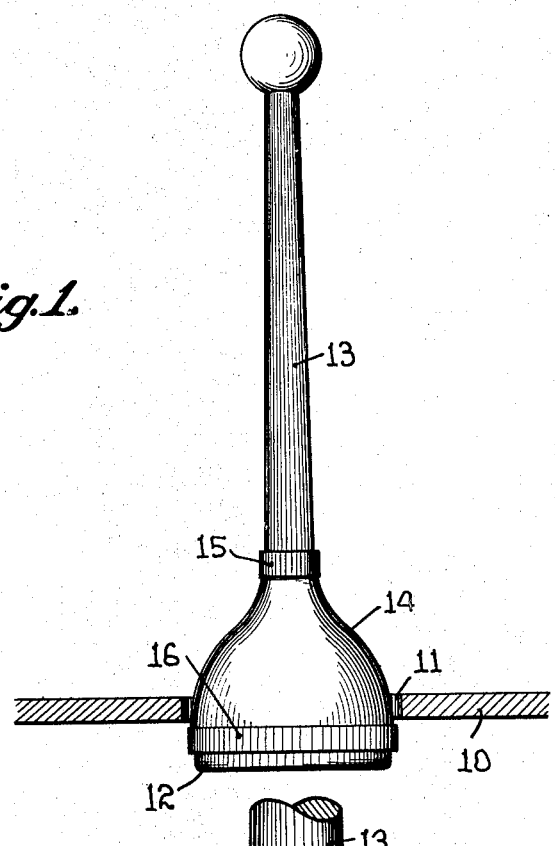
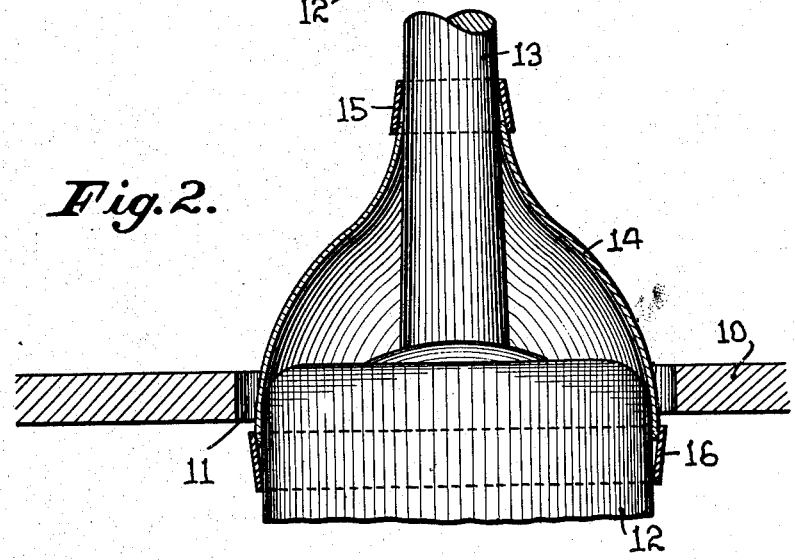
Inventor
STOBO DE PASS CURRY.
By
Attorney Patented Jan. 13, 1925.

1,523,259

UNITED STATES PATENT OFFICE.

STOBO DE PASS CURRY, OF MIAMI, FLORIDA.

PROTECTOR.

Application filed May 5, 1924. Serial No. 711,218.

*To all whom it may concern:*

Be it known that I, STOBO DE PASS CURRY, a citizen of the United States, residing at Miami, in the county of Dade and State of Florida, have invented certain new and useful Improvements in Protectors, of which the following is a specification.

My said invention relates to a gear protector for protecting the clothing of the driver of an automobile in preventing the same from becoming soiled by coming in contact with grease and oil which accumulates around the base of the gear shift lever from time to time during the operation of the machine.

Referring to the accompanying drawings which are made a part hereof and on which similar reference characters indicate similar parts:

Fig. 1 is a side elevation illustrating the application of the invention; and

Fig. 2 a similar enlarged view with the gear protector in section.

In the drawings reference character 10 indicates the floor board of an automobile of the ordinary sliding gear type having an opening 11 therein through which projects the upper end of the housing 12 for the transmission. Extending through the top of the housing 12 is the usual gear shift lever 13 which is used in shifting from one gear to another in the operation of the machine.

In a car of this type grease is put into the housing for the transmission to keep the parts properly lubricated and some of this grease accumulates around the base of the shift lever. When the floor rug is removed grease which has gotten on the rug is often rubbed on the shaft and the handle and must be wiped off each time the rug is removed. Obviously, when the rug is not wiped off, the clothing and hands as well as shoes are damaged.

My invention comprises a flexible bag 14 having a small upper end of a size to snugly fit around the gear shift lever and having its lower end of a much larger size to fit over the end of the housing for the transmission. This bag or cover may be constructed of any flexible material through which grease will not pass, however, I preferably construct the same of rubber.

In order to insure a snug fit around each end I provide flexible bands 15 and 16 of slightly thicker material than the material of which the body of the device is made. As will be observed the larger end of the device extends well below the floor board so that obviously any grease which leaks out around the base of the gear shift lever will be retained on the inside of the device and will effect a better lubrication and prevent soiling the shoes, bottom of the trousers, or other garments of the driver.

It will be obvious that my device may be used in other instances to encase a flexible joint and various modifications will be obvious to those skilled in the art, therefore I do not limit myself to what is shown in the drawings and described in the specification but only as indicated in the appended claim.

Having thus fully described my invention what I claim as new and desire to secure by Letters Patent, is:

A device for preventing the escape of grease around the gear shift lever of an automobile comprising a flexible bag having its small upper end engaging the gear shift lever and having its lower end enlarged and encasing the end of the transmission housing below the floor board, said bag having a band at each end of greater resiliency than the material forming the intermediate portion of the bag to cause it to fit closely about the lever and the housing respectively, substantially as set forth.

In witness whereof, I have hereunto set my hand and seal at Miami, Florida this 28th day of April, A. D. nineteen hundred and twenty-four.

STOBO DE PASS CURRY. [L. S.]

Witnesses:
J. B. DILL,
JOHN T. SEYMOUR.